United States Patent

Balgaard

[11] Patent Number: 5,795,014
[45] Date of Patent: Aug. 18, 1998

[54] VEHICLE ROOF STRUCTURE

[75] Inventor: Steven Patrick Balgaard, Fenton, Mich.

[73] Assignee: General Motors Corporation, Detriot, Mich.

[21] Appl. No.: 762,660

[22] Filed: Dec. 9, 1996

[51] Int. Cl.[6] .................................................. B62D 25/06
[52] U.S. Cl. .................................. 276/210; 296/203
[58] Field of Search ........................... 296/29, 197, 203, 296/210, 213

[56] References Cited

U.S. PATENT DOCUMENTS

| | | |
|---|---|---|
| 2,023,188 | 12/1935 | Abbott . |
| 3,008,760 | 11/1961 | Barenyi . |
| 3,112,952 | 12/1963 | Baronyi ............................. 296/210 |
| 3,233,937 | 2/1966 | Barenyi . |
| 3,239,269 | 3/1966 | Wilfert et al. . |
| 3,635,519 | 1/1972 | Foster et al. . |
| 4,174,710 | 11/1979 | Mori . |
| 4,218,088 | 8/1980 | Swindlehurst et al. ............ 296/210 |
| 4,417,762 | 11/1983 | Imai ................................... 296/210 |
| 4,425,001 | 1/1984 | Mauri ................................ 296/178 |
| 4,471,519 | 9/1984 | Capello et al. ................... 29/460 |
| 4,653,802 | 3/1987 | Watanabe et al. ................ 296/203 |
| 4,863,211 | 9/1989 | Eash .................................. 296/136 |
| 4,883,310 | 11/1989 | Miyazaki et al. ................. 296/210 |
| 4,891,085 | 1/1990 | Mulligan .......................... 156/216 |

FOREIGN PATENT DOCUMENTS 2632923 12/1989 France ................................... 296/210

*Primary Examiner*—Dennis H. Pedder
*Attorney, Agent, or Firm*—Charles E. Leahy

[57] ABSTRACT

A roof structure for a vehicle body includes a roof opening defined by a pair of spaced apart side rails, each having a flange extending inwardly and being vertically offset below the roof surface, and by front and rear headers, each having a flange defining a window opening. A roof panel assembly includes a roof outer panel and a pair of inverted hat-shaped reinforcement rails which underlie the outer side edges of the roof outer panel and include inwardly and outwardly directed legs abutting the underside of the roof outer panel. The outermost portion of the side edges of the roof outer panel are hem flanged over the outwardly directed flanges of the reinforcement rails so that the roof outer panel and the reinforcement rails define the roof panel assembly. The roof outer panel has fore and aft end flanges which overlie the flanges of the front and rear headers and are spot welded thereto. A bead of adhesive is placed on the inwardly extending flanges of the side rails and the roof panel assembly is lowered into the roof opening with the base wall of the reinforcement rails pressed onto the adhesive to attach the roof panel assembly to the vehicle body. The subsequent installation of the front and rear windows hides the spot welds.

4 Claims, 4 Drawing Sheets

1

VEHICLE ROOF STRUCTURE

TECHNICAL FIELD

The invention relates to a vehicle roof structure and, more particularly, provides a new and improved roof panel assembly adhesively bonded to laterally spaced roof rails and spot welded to the front and rear window headers.

BACKGROUND OF THE INVENTION

It is well known in motor vehicles to construct a vehicle body by welding together a plurality of stamped metal panels. In such vehicles, it is commonplace to have a windshield opening defined by spaced apart vertical extending pillars and by a front header which extends laterally between the pillars. A roof opening is defined between laterally spaced roof side rails which extend rearwardly from the juncture between the pillars and the windshield header connected to the side rails. The vehicle body also includes a rear window opening which is similarly defined by vertical pillars and a rear header. The roof opening defined between the front and rear headers and the laterally spaced side rails is closed by the installation of a roof panel which is suitably attached to the side rails and the front and rear headers.

SUMMARY OF THE INVENTION

According to the invention, a roof structure for a vehicle body includes a roof opening defined by a pair of spaced apart side rails, each having a flange extending inwardly and being vertically offset below the roof surface, and by front and rear headers, each having a flange defining a window opening. A roof panel assembly includes a roof outer panel and a pair of inverted hat-shaped reinforcement rails which underlie the outer side edges of the roof outer panel and include inwardly and outwardly directed legs abutting the underside of the roof outer panel. The outermost portion of the side edges of the roof outer panel are hem flanged over the outwardly directed flanges of the reinforcement rails so that the roof outer panel and the reinforcement rails define the roof panel assembly. The roof outer panel has fore and aft end flanges which overlie the flanges of the front and rear headers and are spot welded thereto. A bead of adhesive is placed on the inwardly extending flanges of the side rails and the roof panel assembly is lowered into the roof opening with the base wall of the reinforcement rails pressed onto the adhesive to attach the roof panel assembly to the vehicle body. The subsequent installation of the front and rear windows hides the spot welds.

BRIEF DESCRIPTION OF THE DRAWINGS

These and other objects, features and advantages of the invention will become apparent upon consideration of the Description of the Preferred Embodiment and the appended drawings in which.

DESCRIPTION OF THE PREFERRED EMBODIMENT

Figure 1:
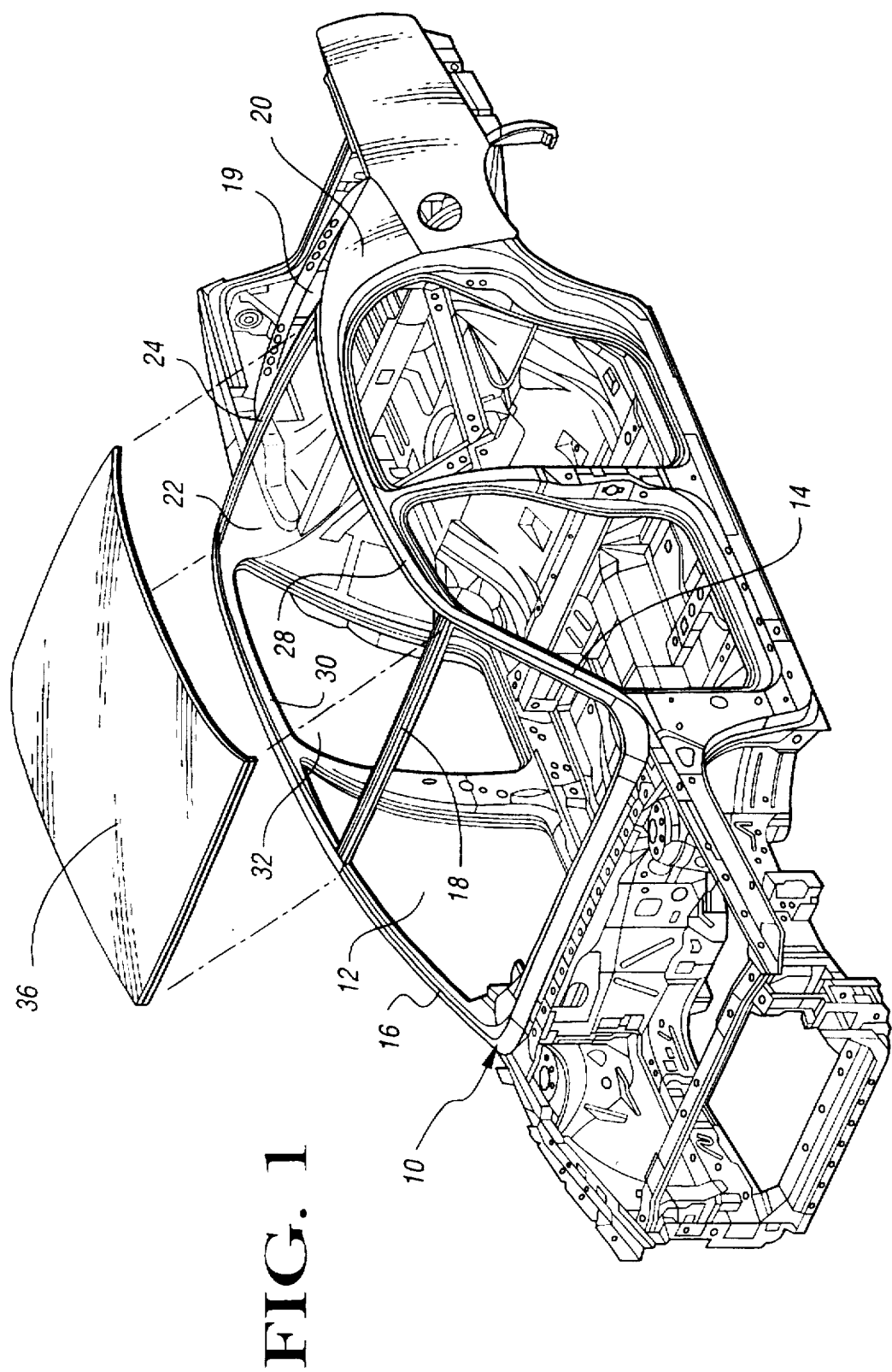
FIG. 1 is a perspective view of a vehicle body according to the invention.

Referring to FIG. 1, it is seen that a vehicle body structure, generally indicated at 10, includes a windshield opening 12 defined by vertical pillars 14 and 16 and a front header 18 which extends between the upper ends of the pillars 14 and 16. A rear window opening 19 is similarly provided by a pair of spaced apart vertical pillars 20 and 22 and a rear header 24. A pair of roof side rails 28 and 30 are laterally spaced apart and extend fore and aft between the front header 18 and rear header 24 to define a roof opening 32. A roof panel assembly 36 is provided for closing the roof opening 32, as will be discussed hereinafter.

Figure 2:
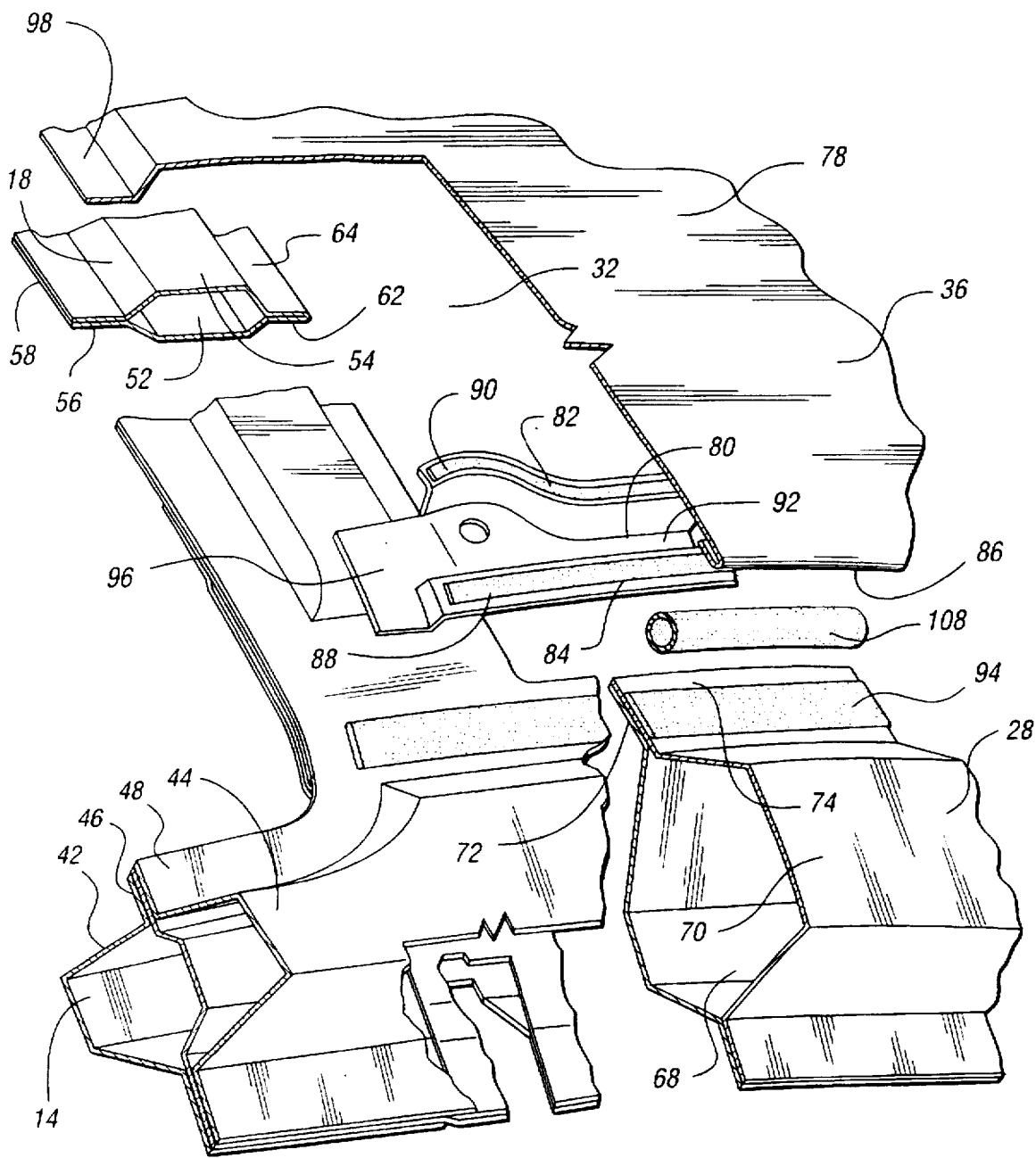
FIG. 2 is an enlarged fragmentary view showing the roof panel subassembly poised above the vehicle body roof opening prior to its installation to close the roof opening.

Referring to FIG. 2, there is shown an enlarged view of the front left corner of the vehicle roof structure, it being understood that the other corners of the roof structure are similarly constructed. As seen in FIG. 2, the pillar 14 includes hat section-shaped panels 42 and 44 which, respectively, have inwardly extending flange portions 46 and 48 extending into the windshield opening 12. FIG. 2 also shows that the windshield header 18 includes inner and outer hat-shaped stampings 52 and 54, respectively having flanges 56 and 58 which are spot welded together and extend into the windshield opening 12, as well as flanges 62 and 64 which are spot welded together.

As also seen in FIG. 2, the side rail 28 includes an inner hat-shaped reinforcement panel 68 and an outer hat-shaped panel 70, respectively having inward extending flanges 72 and 74 which are spot welded together and extend into the roof opening 32.

It will be understood that the hat-shaped panels which make up the pillar 14, header 18 and roof rail 28 are suitably and conventionally interleaved and overlapped together at the juncture thereof and spot welded together to provide a connection or joint therebetween.

Referring again to FIG. 2, it is seen that the roof assembly 36 is comprised of a roof outer panel 78 and a hat-shaped reinforcement rail 80. The hat-shaped reinforcement rail 80 includes an inwardly directed flange 82 and an outwardly directed flange 84 which abut against the underside of the outer panel 78. The roof outer panel 78 is attached to the reinforcement by welding a front end flange portion 98 of the roof outer panel 78 to the forwardmost end of the reinforcement 80. In addition, the roof outer panel 78 is attached to the reinforcement rail 80 by hem flanging the outermost portion of the side edge of the roof outer panel 78 over the outwardly directed flange 84 of the reinforcement 80 to define a hem flange designated at 86. A bead of curable sealer shown at 88 is placed along the face of flange 84 to conventionally seal the hem flange. In addition, a bead of curable sealer 90 is placed along the inward extending flange 82 to seal against the underside of the roof outer panel 78 and prevent vibration and flutter.

The roof assembly 36 is lowered onto the vehicle body with a base wall 92 of reinforcement rail 80 placed atop the inward directed flange 74 of the roof rail outer panel 70. A bead of adhesive 94 is pre-applied along the flange 74 so that the base wall 92 of the reinforcement rail 80 becomes adhesively bonded to the flange 74 of the roof side rail 28. In addition, as seen in FIG. 2, the forwardmost end 96 of the roof rail reinforcement 82 reaches onto the point of juncture between the flange 48 of pillar 14 and the flange 58 of the windshield header 18 so that the reinforcement 80 is welded and adhesively secured thereto.

As best seen in FIG. 4, and FIGS. 5A–5E, it will be understood that the hem flange 86, acting between the roof outer panel 78 and the reinforcement panel 80, is progressively diminished, as the hem flange progresses along the regions shown in FIGS. 5A–5E so that the hem flange 86 terminates and does not underlie the forwardmost portion 96 of the reinforcement 80.

Figure 3:
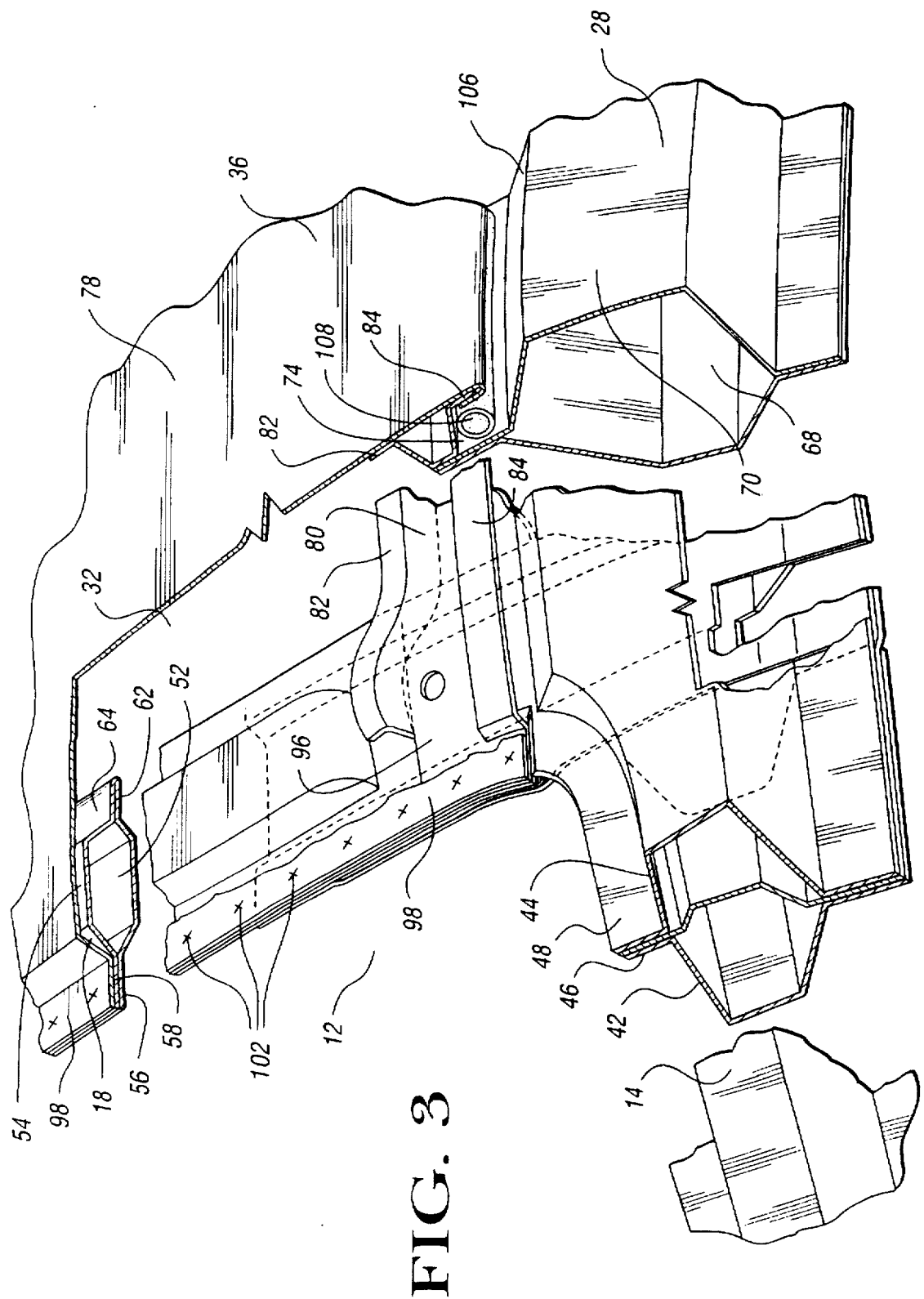
FIG. 3 shows the roof panel assembly installed into the roof opening.
Figure 5A:
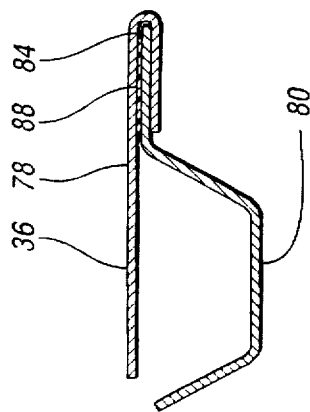
FIGS. 5A, 5B, 5C, 5D and 5E are sectional views taken in the direction of the reference arrows of FIG. 4.
Figure 5B:
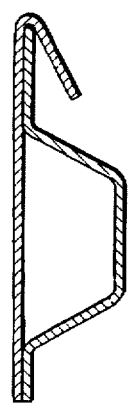
Figure 5C:
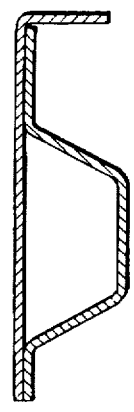
Figure 5D:
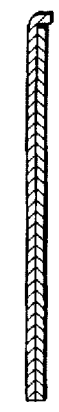
Figure 5E:
Figure 4:
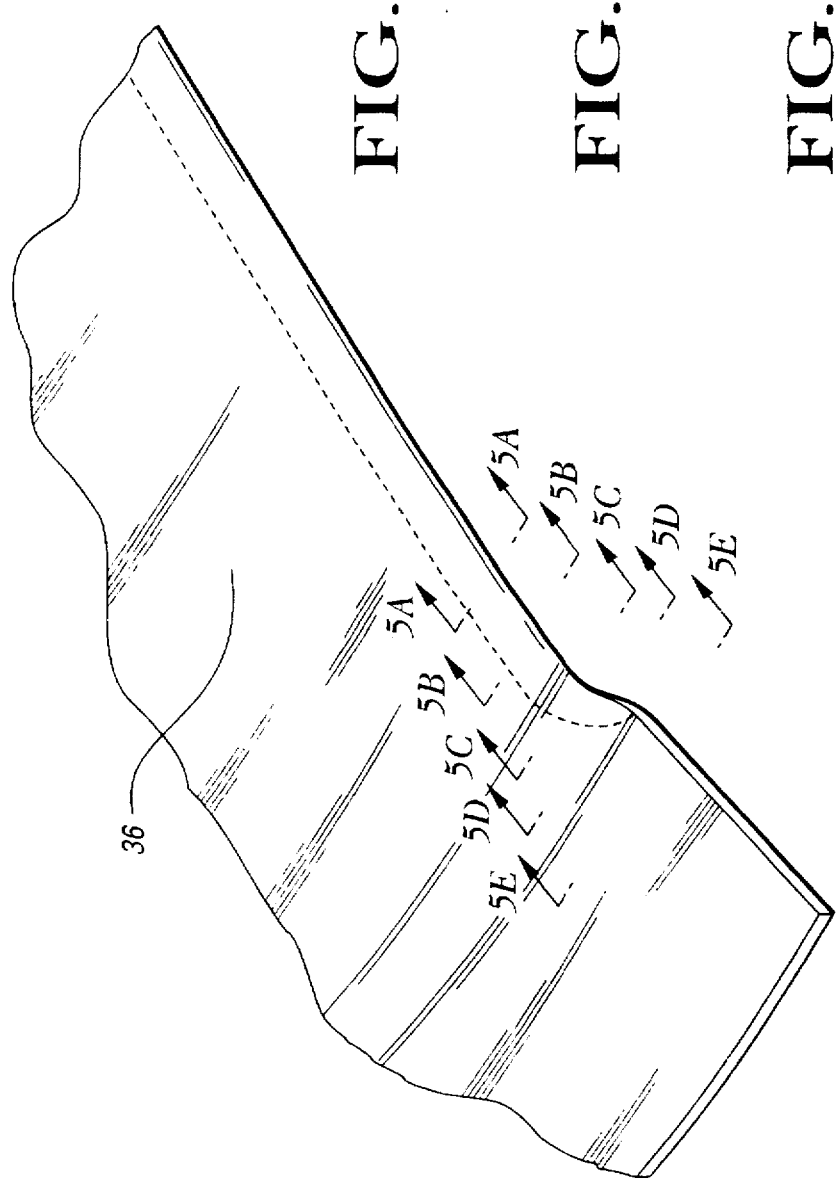
FIG. 4 is an enlarged fragmentary view of FIG. 2 showing the front corner of the roof subassembly panel.

Referring again to FIG. 2, it is seen that the outer panel 78 includes an end flange portion 98 along the leading edge thereof, which is downwardly bent to lie atop the flange 58 of windshield header 18. In addition, this flange 98 of the outer panel 78 lies atop the forwardmost portion 96 of reinforcement rail 80. As seen in FIG. 3, a plurality of spot welds are applied at 102 to suitably and permanently weld the outer panel 78 of the roof assembly 36 onto the flanges 56 and 58 of the windshield header 18. Although not shown in the drawings, the rear end of the outer panel 78 was a flange portion similar to flange 98 and is similarly spot welded to the rear header 24.

As best seen in FIG. 3, a gap 106 extends fore and aft between the roof rail 28 and the roof assembly 36. This gap, about 5 mm. in width, becomes an aesthetically pleasing design detail of the appearance of the vehicle body. If desired, a compressible tubular seal 108 may be inserted onto the flange 74 of the side rail 28 after assembly of the roof panel assembly 36 so that the seal 108 takes up space and conceals any overflow of the adhesive bead 74 which might result during the placement of the roof assembly 36 into the roof opening.

Thus, it is seen that the invention provides a new and improved roof structure for a motor vehicle body in which the roof subassembly panel is successfully attached to the roof opening structure by adhesives and by spot welding.

I claim:

1. A roof structure for a vehicle body including a roof opening defined by a pair of spaced side rails each having a flange extending inwardly and vertically offset below the roof surface and front and rear headers each having a flange defining a window opening:

a roof outer panel overlying the roof opening and having outer side edges which overlie the inwardly extending flanges of the side rails and fore and aft edges which overlie the front and rear headers and the flanges thereof;

an inverted hat-shaped reinforcement rail underlying the outer side edges of the roof outer panel and including inwardly and outwardly directed flanges abutting against the roof outer panel, said reinforcement rails also including a base wall abutted against the flanges of the side rails;

a hem flange attaching the outermost portion of the side edges of the roof outer panel to the reinforcement rail by hem flanging the roof outer panel over the outwardly directed flange of the reinforcement rails;

an adhesive acting between the base wall of the reinforcement rails and the inwardly directed flanges of the side rails;

and a plurality of spot welds acting as the fore and aft edges of the roof outer panel and the flanges of the front and rear headers.

2. The roof structure of claim 1 further characterized by the hem flange acting between the roof outer panel and the reinforcement rail terminating at the rearward and forwardmost sides thereof so that the fore and aft edges of the roof outer panel which are spot welded to the front and rear headers are free of such hem flange and only the roof outer is welded to the header.

3. The roof structure of claim 1 further characterized by a compressible seal member interposed between the hem flange and the side rail to conceal adhesive overflow.

4. The roof structure of claim 1 further characterized by a bead of curable sealer active between the roof outer panel and the reinforcement rail.

* * * * *